(12) United States Patent
Le Roux Cilliers et al.

(10) Patent No.: US 6,745,621 B1
(45) Date of Patent: Jun. 8, 2004

(54) MEASURING TWIST DUE TO TORQUE IN A RATATING SHAFT

(75) Inventors: Bartolomomeus Johannes Le Roux Cilliers, Pretoria (ZA); Roelof Grove Blignaut, Pretoria (ZA)

(73) Assignee: Technology Finance Corporation (Proprietary) Limited, Sandton (ZA)

( * ) Notice: Subject to any disclaimer, the term of this patent is extended or adjusted under 35 U.S.C. 154(b) by 0 days.

(21) Appl. No.: 10/089,747
(22) PCT Filed: Oct. 5, 2000
(86) PCT No.: PCT/ZA00/00181
§ 371 (c)(1), (2), (4) Date: Jul. 8, 2002
(87) PCT Pub. No.: WO01/25738
PCT Pub. Date: Apr. 12, 2001

(30) Foreign Application Priority Data

Oct. 5, 1999 (ZA) .................................. 99/6182

(51) Int. Cl.$^7$ .................... G01L 3/26; G01L 5/13; G01L 3/02; G01L 3/10; G01M 15/00
(52) U.S. Cl. .................. 73/117.3; 73/862.324
(58) Field of Search .............. 73/862.28, 862.324, 73/862.045, 117.3, 116, 862.328, 862.326, 862.191, 650, 862.08; 702/43

(56) References Cited

U.S. PATENT DOCUMENTS

| 4,609,992 | A | * | 9/1986 | Bray ........................ 364/508 |
|---|---|---|---|---|
| 4,627,297 | A | | 12/1986 | Akimoto |
| 4,811,238 | A | * | 3/1989 | Gerrath et al. ............ 364/508 |
| 4,995,257 | A | * | 2/1991 | Leon ........................ 73/116 |
| 5,297,044 | A | | 3/1994 | Sakaki et al. |
| 5,438,882 | A | * | 8/1995 | Kari-Panahi et al. ........ 73/862.324 |
| 5,440,938 | A | * | 8/1995 | Leon et al. ............ 73/862.191 |
| 5,544,537 | A | * | 8/1996 | Konzal ...................... 74/53 |
| 5,546,793 | A | * | 8/1996 | Gimmler et al. ............ 73/116 |
| 5,771,483 | A | * | 6/1998 | Moine et al. ............... 701/110 |

FOREIGN PATENT DOCUMENTS

| DE | 40 38 413 A1 | 6/1992 |
|---|---|---|
| WO | 96/20395 | 7/1996 |

* cited by examiner

Primary Examiner—Edward Lefkowitz
Assistant Examiner—Octavia Davis
(74) Attorney, Agent, or Firm—Frommer Lawrence & Haug LLP; William S. Frommer

(57) ABSTRACT

In a reciprocating engine, power strokes of pistons apply torque to a crankshaft causing it to twist proportionally. Datum time moments are established by triggers rotating with, at one end of, the crank shaft and a sensor sensing passing of the triggers. At an opposed end, ring gear teeth trigger a sensor. At no load, zero twist occurs and arrival time moments of the triggers in relation to the datum time moments are predictable. Under load, twisting in the crank shaft causes the arrival time moments to be delayed, the time lag being proportional to the twist, bearing in mind the effect of rotational speed. With information about physical twist-torque characteristics of the crankshaft, torque values are calculated from the measured twist values, and are used in engine management. The invention can be applied to any shaft, for example also a main shaft of a gas turbine engine.

17 Claims, 2 Drawing Sheets

MEASURING TWIST DUE TO TORQUE IN A RATATING SHAFT

BACKGROUND OF THE INVENTION

Field of the Invention

THIS INVENTION relates to measuring twist due to torque in a rotating shaft. It relates more specifically to a method of and measuring apparatus for measuring twist in a rotating shaft subjected to torque, to a method of and a measuring apparatus for measuring torque in a rotating shaft, and to a method of and an apparatus for managing operation of an engine.

International Patent Document WO 96/20395 discloses a process and device for determining a power output rate between a rotary shaft and one or more stationary machines connected to the shaft. The shaft is subjected to torque causing torsional deformation which is measured as an angle. Power output is determined as the product of the angle and a predetermined calibration coefficient.

International Patent Document WO 96/20395 discloses a process and device for determining a power output rate between a rotary shaft and one or more stationary machines connected to the shaft The shaft is subjected to torque causing torsional deformation which is measured as an angle, Power output is determined as the product of the angle and a predetermined calibration coefficient.

BRIEF SUMMARY OF THE INVENTION

The term "twist" is for convenience used for purposes of this invention to denote angular deflection or angular deformation.

In accordance with a first aspect of this invention, broadly, there is provided a method of measuring twist in a rotating shaft which is subjected to torque including sensing an arrival time moment of a measure point an the shaft at a fixed measure station, comparing the arrival time moment with a computed arrival time moment of said measure point at said measure station under a no load condition, measuring rotational speed of the shaft, and calculating the twist in the shaft on the basis of the time lag and the rotational speed.

The method may include sensing and recording a datum time moment when a datum point on the shaft, longitudinally spaced from said measure point by a predetermined distance, passes a fixed datum station, and measuring a measure time period between said datum time moment and said arrival time moment.

The method may include empirically predetermining a datum time period between a datum time moment and an arrival time moment under a no load condition at a determined rotational speed, and computing a computed time period and a computed arrival time moment for any specific rotational speed on the basis of the datum time period bearing in mind the respective rotational speeds.

In accordance with the first aspect of this invention, more specifically, there is provided method of measuring twist in a rotating shaft which is subjected to torque, between a datum point on the shaft and a measure point on the shaft longitudinally spaced from the datum point, the method Including establishing a datum time period between a datum time moment the datum point passes a stationary datum station and a time moment the measure point passes a stationary measure station under a no load condition and recording rotational speed of the shaft as the datum speed;

measuring a measure time period between a time moment the datum point passes the stationary datum station and a time moment the measure point passes the stationary measure station when the shaft is subjected to torque, recording the rotational speed of the shaft as the measure speed and establishing longitudinal positions respectively at which torque is applied and of the datum point and of the measure point;

calculating the twist in the shaft from the difference between the measure time period and the datum time period, bearing in mind the difference between the measure speed and the datum speed.

A torque point at which torque is applied to the shaft and a load point at which a load is connected to the shaft may be longitudinally spaced, the shaft being stressed and undergoing twist between the torque point and the load point, one of the measure point and the datum point being positioned along said stressed portion of the shaft, the other of the measure point and the datum point being positioned in a relaxed portion of the shaft beyond one of the torque point and the load point.

Advantageously, the method may be applied to a shaft in the form of a crankshaft of a reciprocating internal combustion engine. The reciprocating engine may include a ring gear having gear teeth at one end of the crankshaft and a disc at an opposed end of the crankshaft, the datum point being on the disc, the measure point being on a gear tooth of the ring gear. The method is preferably performed in respect of a plurality of measure points and a plurality of datum points, the plurality of measure points being on a corresponding plurality of gear teeth of the ring gear and the plurality of datum points being points which are circumferentially spaced on the disc. Advantageously, the number of datum points and the number of measure points may be equal, to allow the respective datum points and measure points to be associated on a one-on-one basis.

When the reciprocating internal combustion engine includes a plurality of cylinders, the method may be performed in respect of each cylinder. Furthermore, the method may be performed for each power stroke of the reciprocating internal combustion engine.

In another technical application, the method may be applied to a gas turbine engine, the shaft then being a main shaft of the gas turbine engine.

Then, at least one of the datum point and the measure point may be on a vane of at least one of a compressor and a turbine of the gas turbine engine. However, the method is preferably performed in respect of a plurality of measure points and a pluralite of datum points, the plurality of measure points being an a corresponding plurality of vanes of one of the compressor and the turbine and the plurality of datum points being on a corresponding plurality of vanes of the other of the compressor and the turbine, the sensors being external of casings surrounding respectively the compressor and the turbine.

Generally, establishing the time moments may include triggering a sensor at respectively the datum station and the measure station by means of triggers at correspondingly the or each datum point and the or each measure point, creating a signal by each sensor and recording the signal against time.

The triggers may be masses of magnetic material, and the sensors may be responsive to said magnetic material to create said signals.

Instead, the triggers may be optically detectable surfaces, the sensors then sensing passing of the triggers optically.

In accordance with a second aspect of this invention, there is provided measuring apparatus for measuring twist in a rotating shaft which is subjected to torque, the measuring apparatus including at least one datum trigger at a datum point on the shaft;

a datum sensor at a stationary datum station arranged to sense said at least one datum trigger when said at least one datum point is in register with the datum station and to generate correspondingly at least one datum signal;

at least one measure trigger at correspondingly at least one measure point on the haft longitudinally spaced from said at least one datum point;

a measure sensor at a stationary measure station arranged to sense said at least one measure trigger when said at least one measure trigger is in register with the measure station and to generate correspondingly at least one measure signal;

a clock keeping time;

a rotational speed meter for measuring and recording rotational speeds of the shaft against time respectively as the datum speed and as the measure speed;

recording means for recording said datum and measure signals against time;

a processor programmed to establish correspondingly at least one datum time period between a time moment said at least one datum point passes the datum station and a time moment said at least one measure point passes the measure station under no load conditions and recording the rotational speed of the shaft as the datum speed, correspondingly at least one measure time period between a time moment said at least one datum point passes the stationary datum station and a time moment said at least one measure point passes the stationary measur station when the shaft is subjected to torque and recording the rotational speed of the shaft as the measure speed, and the twist of the shaft from the difference between said at least one measure time period and said at least one datum time period, bearing in mind the ratio between the measure speed and the datum speed.

The shaft may include a torque point at which torque is applied to the shaft in use and a load point at which a load is connected to the shaft in use, the torque point and the load point being longitudinally spaced, the shaft, in use, being stressed and undergoing twist between the torque point and the load point, one of the or each measure point and the or each datum point being positioned along said stressed portion of the shaft, the other of the or each measure point and the or each datum point being positioned in a relaxed portion of the shaft beyond one of the torque point and the lad point.

The shaft may advantageously be a crankshaft of a reciprocating internal combustion engine. Then the measuring apparatus may preferably include a plurality of measure points and a plurality of datum points.

Advantageously, the reciprocating engine may include a ring gear having gear teeth at one end of the crankshaft and a disc at an opposed end of the crankshaft, the datum points and the measuring points being respectively on gear teeth of the ring gear and at circumferentially spaced positions on the disc.

In another technical application, the shaft may be a main shaft of a gas turbine engine. Then, at least one of the datum point and the measure point is on correspondingly at least one of a vane of a compressor and a vane of a turbine of the gas turbine engine. However, the measuring apparatus may include a plurality of datum points and a plurality of measure points, the datum points and the measure points being respectively on vanes of the compressor and the turbine.

The triggers may be masses of magnetic material, and the sensors may be magnetic sensors responsive to said magnetic material to generate signals. The magnetic sensors may be arranged externally of casings surrounding respectively the compressor and the turbine.

Instead, the triggers may be optically detectable surfaces, and the sensors may be optical sensors responsive to the optically detectable triggers to generate signals.

In accordance with a third aspect of this invention, there is provided a method of measuring torque in a rotating shaft, including measuring twist in the rotating shaft in accordance with the first aspect of this invention, and calculating torque on the basis of the measured twist bearing in mind a pre-established length of the shaft aver which length said twist is measured, and pre-established physical characteristics of the shaft determining torque-twist behaviour of the shaft.

Said physical characteristics of the shaft determining torque-twist behaviour of the shaft may advantageously be established empirically.

In accordance with a fourth aspect of this invention, there is provided a measuring apparatus for measuring torque in a rotating shaft, which includes a measuring apparatus for measuring twist in accordance with the second aspect of this invention, in which the processor is programmed to calculate torque on the basis of the measured twist bearing in mind a pre-established length of the shaft over which length said twist is measured and preestablished physical characteristics of the shaft determining torque-twist behaviour of the shaft, In accordance with a fifth aspect of this invention, there is provided a method of managing operation of an engine including measuring a quantity related to torque in a drive shaft of the engine in accordance with the first aspect or the third aspect of this invention, comparing the measured value of said quantity related to torque to a predetermined standard value of said quantity, establishing any deviation between the measured value and the standard value and controlling an operating function of the engine in response to said establish deviation.

Said operating function of the engine may be at least one of ignition timing when the engine is a spark ignition engine, injector pump timing when said engine is a diesel engine, boost pressure when said engine is turbocharged or supercharged.

Advantageously, the method may include automatically calibrating the measuring apparatus in respect of datum time periods when the engine is operated under a no load condition.

In accordance with a sixth aspect of this invention, there is provided an engine including a measuring apparatus in accordance with the second aspect or the fourth aspect of this invention;

an engine management apparatus including a comparator arranged to receive a signal indicative of a measured value of a quantity related to torque in a drive shaft of the engine from the measuring apparatus, the comparator being preprogrammed to compare said measured value with a standard value of said quantity related to torque to generate a control signal, the engine management apparatus being responsive to said control signal to control an operating function of the engine.

Said operating function of the engine may be at least one of ignition timing when the engine is a spark ignition engine, injector pump timing when said engine is a diesel engine, boost pressure when said engine is turbocharged or supercharged.

Advantageously, the engine management apparatus may be preprogrammed to calibrate the measuring apparatus in respect of datum time periods when the engine is operated under a no load condition.

The invention will now be described, by way of examples, with reference to the accompanying diagrammatic drawings.

DETAILED DESCRIPTION OF THE INVENTION

Figure 1:
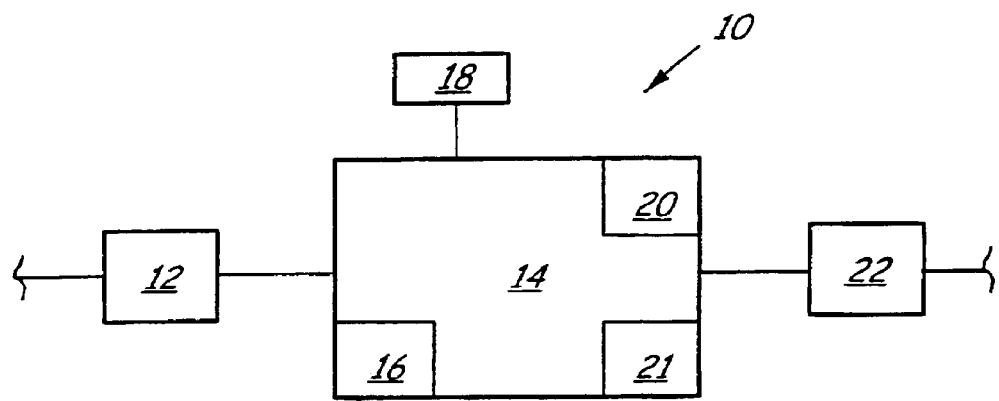
FIG. 1 shows a block diagram of an apparatus for measuring torque in accordance with the invention.
Figure 2:
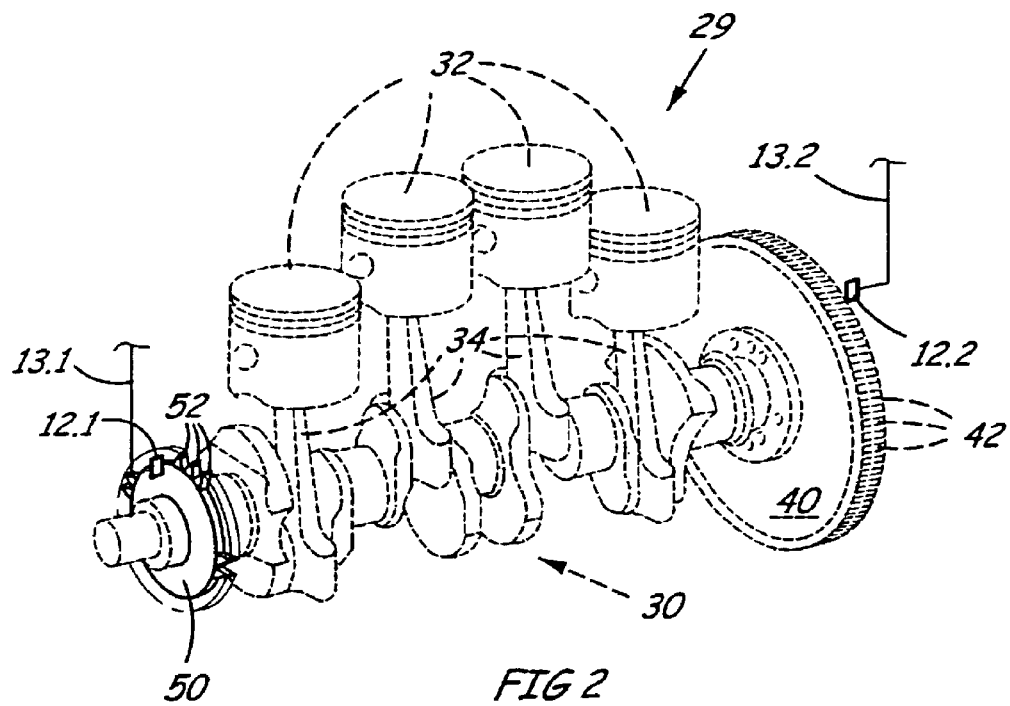
FIG. 2 shows, in three dimensional view, the invention applied to a reciprocating internal combustion engine.

Referring to FIGS. 1 and 2 of the drawings; reference numeral 10 generally indicates a measuring apparatus in accordance with the invention.

The apparatus 10 measures twist in a drive shaft in the form of a crankshaft 30 (see FIG. 2 of the drawings) of a reciprocating internal combustion engine 29. In FIG. 2 only the pistons 32 of the engine, and connection of the pistons 32 via connecting rods 34 to cranks of the crankshaft 30 of the engine, are shown.

A flywheel 40 incorporating a ring gear having a plurality of circumferentially spaced teeth 42 is mounted at one end of the crankshaft 30. The flywheel 40 and specifically also the teeth 42 are of a magnetic material. During operation of the engine, thrust of the pistons 32 during power strokes causes twist in the crankshaft 30.

In order to measure said twist, the measuring apparatus 10 includes a circular metallic disc 50 secured to the end of the crankshaft 30 opposite the flywheel 40. The disc 50 has a plurality of formations or teeth 52 defining triggers in the form of datum points. The teeth, in this embodiment, are of magnetic material.

The apparatus 10 further includes a sensor in the form of a magnetic sensor or pick-up device 12.1, e.g. Part No. 304166 from the RS catalogue, mounted on the engine adjacent a pitch circle of the teeth 52 of the disc so as to be registered sequentially with the teeth as the disc 50 rotates with the crankshaft 30. Each time a tooth 52 is in register with the sensor 12.1 a signal in the form of a pulse is produced, and is conveyed to the apparatus 10 as shown at 13.1. The teeth define triggers in the form of datum points.

The apparatus 10 also includes a sensor in the form of a magnetic sensor or pick-up device 12.2, e.g. Part No. 304166 from the RS catalogue, mounted on the engine adjacent a pitch circle of the teeth 42 of the ring gear on the fly wheel 40 so as to be registered sequentially with the teeth as the flywheel 40 rotates with the crankshaft 30. Each time a tooth 42 is in register with the sensor 12.2, a signal in the form of a pulse is produced and is conveyed to the apparatus 10 as shown at 13.2. The teeth 42 define triggers in the form of measure points.

In another embodiment, the sensors 12.1, 12.2 may be optical sensors and the triggers 42, 52 may be optically detectable surfaces.

For convenience, the sensors 12.1, 12.2 or the signal outputs 13.1, 13.2 are shown at 12 in FIG. 1.

As the crank shaft 30 rotates, when each datum point 52 passes the sensor 12.1, a signal pulse is generated and is recorded in a processor 14 (FIG. 1) including a clock 1.8, thus setting a datum time moment. The clock 18 typically operates at a frequency of 10 MHz.

Assume the crank shaft 30 rotates under no load and at a rotational speed which is measured and recorded (conveniently in the processor 14 by means of the signal pulses generated by the sensor 12.1 on being passed by the datum points 52). Being under no load, the crank shaft 30 is under zero twist. The arrival time moments of the respective triggers 52 are sensed and are recorded as are the respective time periods between respective datum time moments and the respective arrival time moments—bearing in mind the rotational speed of the crank shaft 30. From this empirically derived data, computed arrival time periods, under no load conditions, can be computed by the processor 14 for any given or measured rotational speed. Advantageously, the number of datum points and the number of measure points are equal and they can then advantageously be associated on a one-on-one basis. If the number of points are not the same, each measure point is associated with an appropriate or most appropriate datum point, for example on the basis of minimizing the time periods.

When the crank shaft 30 rotates under load, the power strokes of the pistons 32 impart torque pulses to the crank shaft causing twist in the crank shaft. The amount of twist depends on physical characteristics of the crank shaft, e.g. effective moment of inertia and the torsional Young's modulus of the material of the crank shaft, the effective length over which the torque is applied (i.e. the longitudinal distance between the respective big end bearing and the flywheel 40), and the magnitude of the torque. All of the above except the magnitude of the torque remain constant for each piston 32, and can be preestablished for each engine or type of engine, advantageously empirically. Thus, the amount of twist uniquely defines the magnitude of the torque.

Furthermore, due to the twist, the respective triggers 42 arrive at the sensor 12.2 late relative to a respective computed arrival time moment. The amount of time lag, bearing in mind the rotational speed and the length over which the torque is transmitted, uniquely defines the twist.

The processor 14 is programmed to measure the respective time lags and to calculate the respective twists, as mentioned above, taking into account the rotational speed and the lengths over which the torque is transmitted, for the respective piston power strokes which are obtained from the firing order of the specific engine. From the calculated twist, the torque applied in each power stroke of each piston is calculated.

The apparatus 10 accordingly includes the processor 14 including a comparator 16 into which the respective signals are input from item 12.

Arrival time moments are compared by the comparator 16, from which the time periods are measured by the clock 18. Typically, the clock 18 operates at a frequency of 10 MHz, as mentioned above. The Applicants expect such resolution to be sufficient for purposes of this invention for use in commercial reciprocation engines.

The time periods are compared and twist, and ultimately torque values, are calculated as explained above. Results are stored in a data storage means 20, overwriting any previously stored value therein every second revolution in the case of a four-stroke engine.

The processor 14 further includes a second comparator 21 which includes a dataset prepared before installation and characterizing the engine when it is performing optimally. The dataset includes the optimum twist values or torque values in the crankshaft 30 for a wide range of speed and other conditions. The dataset is stored in the form of a regression equation. The comparator 21 compares torque output or a quantity related to torque as measured and calculated in accordance with this invention with a standard or reference value in the dataset. The comparator 21, and control 22 mentioned below, in combination with the processor 14, form an engine management apparatus in accordance with the invention.

Based on said comparison, a signal is generated and sent to a control 22, forming part of the apparatus 10. The control 22 is configured to control an operating function of the engine e.g. ignition timing for a spark ignition engine, injector timing in the case of a diesel engine, boost pressure in the case of a turbocharged or supercharged engine, and the like, thereby to optimize engine performance. Thus it is possible to dynamically control engine performance at the level of individual pistons based on measurement of twist or torque or related quantity in the crankshaft 30 of the engine.

By having large numbers of datum points and measure points, the frequency of measurement during a revolution of the flywheel 40 is high and as a result the torque output of each piston 32 can be resolved accurately.

Advantageously, the processor 14 is preprogrammed during processing to process the measured data, for example by making use of Fast Fourier Transforms, to ameliorate the effect of vibrations and resonances in reciprocating and rotating components of the engine on the measured data and thus to isolate or to isolate to a degree. Information which is useful in the context of this invention.

Further, advantageously, the engine management apparatus is preprogrammed, when the engine is operated under no load (for example when it is idling), to calibrate the measuring apparatus in respect of datum time periods. This has, inter alia, the advantages that calibrating takes place regularly and thus also compensates for changes in ambient conditions and engine conditions (e.g. ambient and engine temperatures).

The Applicants believe that it is an advantage of the invention that it provides a system for monitoring engine performance which makes use of magnetic sensors which produce a well defined signal, are relatively robust, and have a good service life considering the harsh operating conditions of an engine. Further, by making use of the teeth of the flywheel and teeth on a disc fast with the crankshaft as measure and datum points, the system can be manufactured cost effectively. Further, an advantage of the system is that it makes use of the time lag between the respective signals when the crankshaft 30 is under load relative to when it is under no load and is thus self-calibrating in that variations due to e.g. temperature effects, mechanical manufacture variations/tolerances etc. are compensated for. The Applicants believe that by optimizing engine performance in accordance with the invention, the toxic content of exhaust fumes may be reduced. A further advantage of the invention is that it provides a system for real time measuring twist in a crankshaft during operation of an engine and to control operating functions in real time of the engine thereby to optimize engine performance.

Figure 3:
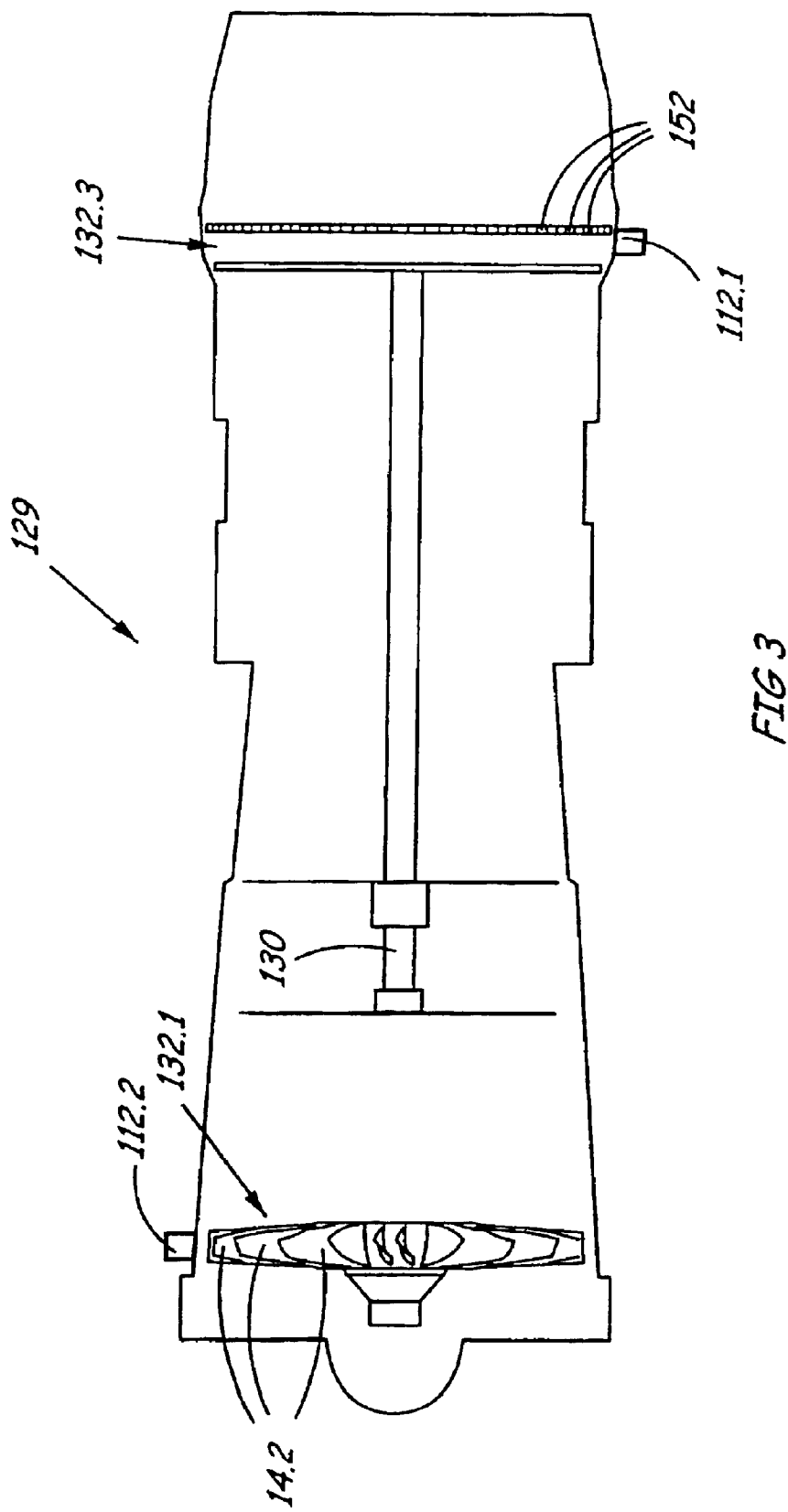
FIG. 3 corresponds to FIG. 2, but shows a gas turbine engine.

With reference to FIG. 3, a gas turbine engine is generally indicated by reference numeral 129. The gas turbine engine is shown schematically, mainly in outline. The gas turbine engine 129 includes a main shaft 130 to which the current invention is applied. Conventionally, the gas turbin engine includes a low pressure compressor represented by one stage 132.1 thereof adjacent an inlet of the gas turbine engine, a high pressure compressor downstream of the low pressure compressor, a combustion chamber, turbine stages 132.3 and an outlet.

In accordance with the invention, twist of the main shaft 130 is measured and torque is derived from the measured twist. These measurements and calculations are effected in the same fashion as d scribed with reference to FIGS. 1 and 2 for the reciprocating engine. Thus, also on the gas turbin engine, datum triggers 152 trigger a sensor 112.1 to generate a signal. The triggers 152 are conveniently provided on or by turbine vanes toward a rear end of the central shaft.

Furthermore, triggers are provided on or by the respective vanes of a first stage 132.1 of the low pressure compressor toward a front of the central shaft 130, and a sensor 112.2 is provided peripherally adjacent the pitch circle of the compressor vanes.

It is to be appreciated that stages other than the first stage of the low pressure compressor and the last stage of the turbine may be used to locate the triggers. Furthermore, it is to be appreciated that it is possible that a time lead as opposed to a time lag may be measured. For purposes of this invention a time lead is to be regarded as a negative time lag.

It is regarded as an important advantage that casings surrounding the compressor and turbine stages are of non-magnetic material, whereas the vanes are of magnetic material. Thus, the invention can be applied in a non-invasive manner, in so far as the sensors can be external of the casings.

It is to be appreciated that operation of a gas turbine engine approximates a steady state condition during any one revolution or small number of revolutions. Thus, first, torque fluctuations are expected to be substantially less than for a reciprocating engine. Thus, the Applicant envisages that a smaller number of triggers may be sufficient, also bearing in mind that, in gas turbine engines, very high speeds are sometimes used.

In other respects, performing the invention and the advantages obtained from the invention are substantially the same as explained with reference to FIGS. 1 and 2 in respect of the reciprocating engine.

What is claimed is:

1. A method of measuring twist in a rotating shaft of an engine which shaft is subjected to torque, between a datum point on the shaft and a measure point on the shaft longitudinally spaced from the datum point, the method including establishing a datum time period between a datum time moment the datum point passes a stationary datum station and a time moment the measure point passes a stationary measure station under a no load condition and recording rotational speed of the shaft as the datum speed;

measuring a measure time period between a time moment the datum point passes the stationary datum station and a time moment the measure point passes the stationary measure station when the shaft is subjected to torque, recording the rotational speed of the shaft as the measure speed and establishing a length of the shaft over which torque is applied;

calculating the twist in the shaft on the basis of the difference between the measure time period and the datum time period, the measure speed and the length over which torque is applied, including ameliorating the effects of vibrations and resonances in rotating or reciprocating components of the engine to isolate at least to a degree data relating to said difference between the measure time period and the datum time period, said measure speed and said length over which torque is applied, by means of a preprogrammed processor.

2. A method as claimed in claim 1 in which a torque point at which torque is applied to the shaft and a load point at which a load is connected to the shaft are longitudinally spaced, the shaft being stressed and undergoing twist between the torque point and the load point, one of the measure point and the datum point being positioned along a stressed portion of the shaft, the other of the measure point and the datum point being positioned in a relaxed portion of the shaft between one of the torque point and the load point.

3. A method as claimed in claim 2 in which the shaft is a crankshaft of a reciprocating internal combustion engine which includes a plurality of cylinders, a ring gear having gear teeth at an end of the crankshaft and a disc at an opposed end of the crankshaft, said measure point being provided respectively by a plurality of measure points respectively on a corresponding plurality of gear teeth of the ring gear, said datum point being provided respectively by a plurality of datum points circumferentially spaced on said disc, the method being carried out for each power stroke of said reciprocating internal combustion engine and using the plurality of measure points and the plurality of datum points.

4. A method as claimed in claim 1 in which the shaft is a main shaft of a gas turbine engine, the method being carried out in resect of a plurality of measure points and a plurality of datum points, the plurality of measure points being on a corresponding plurality of vanes of one of the compressor and the turbine and the plurality of datum points being on a corresponding plurality of vanes of the other of the compressor and the turbine, the sensors being external of casings surrounding respectively the compressor and the turbine to cause the method to be carried out in a non-invasive manner, in which said vanes providing respectively the measure points and the datum points are masses of magnetic material and said sensors are responsive to proximity of said magnetic material to generate signals for recording respectively datum time moments and measure time moments.

5. A method of managing operation of an engine including measuring a quantity related to torque in a drive shaft of the engine as claimed in claim 1, comparing the measured value of said quantity related to torque to a predetermined standard value of said quantity, establishing any deviation between the measured value and the standard value and controlling an operating function of the engine in response to said established deviation.

6. A method as claimed in claim 5 in which said operating function of the engine is at least one of ignition timing when the engine is a spark ignition engine, injector pump timing when said engine is a diesel engine, boost pressure when said engine is turbo charged or supercharged.

7. A method as claimed in claim 5 including automatically calibrating the measuring apparatus in respect of datum time periods when the engine is operated under a no load condition.

8. A method as claimed in claim 1 in which preprogramming said processor includes preprogramming it to employ appropriate Fast Fourier Transforms for said ameliorating effects of vibrations and resonances.

9. A method of measuring twist in a rotating shaft of an engine which shaft is subjected to torque, the method including sensing and recording a datum time moment when a datum point on the shaft passes a fixed datum station; sensing, at a fixed measure station, an arrival time moment of a measure point on the shaft, longitudinally spaced from said datum point by a predetermined distance; measuring a measure time period between said datum time moment and said arrival time moment; measuring rotational speed of the shaft; comparing the measure time period with a computed time period under a no load condition; and calculating the twist in the shaft on the basis of the time lag and the rotational speed including ameliorating the effects of vibrations and resonances in rotating or reciprocating components of the engine to isolate at least to a degree data relating to said measure time period, and said rotational speed, by means of a pre-programmed processor.

10. A measuring apparatus for measuring twist in a rotating shaft of an engine which shaft is subjected to torque, the measuring apparatus including at least one datum trigger at a datum point on the shaft;

a datum sensor at a stationary datum station arranged to sense said at least one datum trigger when said at least one datum point is in register with the datum station and to generate correspondingly at least one datum signal;

at least one measure trigger at correspondingly at least one measure point on the shaft longitudinally spaced from said at least one datum point;

a measure sensor at a stationary measure station arranged to sense said at least one measure trigger when said at least one measure trigger is in register with the measure station and to generate correspondingly at least on measure signal;

a clock keeping time;

a rotational speed meter for measuring and recording rotational speeds of the shaft against time respectively as the datum speed and as the measure speed;

recording means for recording said datum and measure signals against time;

a processor programmed to establish correspondingly at least one datum time period between a time moment said at least one datum point passes the datum station and a time moment said at least one measure point passes the measure station under no load conditions and recording the rotational speed of the shaft as the datum speed, correspondingly at least one measure time period between a time moment said at least one datum point passes the stationary datum station and a time moment said at least one measure point passes the stationary measure station when the shaft is subjected to torque and recording the rotational speed of the shaft as the measure speed, and the twist in the shaft on the basis of the difference between said at least one measure time period and said at least one datum time period, the measure speed and a length of the shaft over which torque is applied, the processor being pre-programmed to ameliorate the effects of vibrations and resonances in rotating or reciprocating components of the engine to isolate at least to a degree data relating to said at least one datum time period, said at least one measure time period, said datum speed of the shaft, said measure speed of the shaft and said length of the shaft over which torque is applied.

11. A measuring apparatus as claimed in claim 10 in which the shaft includes a torque point at which torque is applied to the shaft in use and a load point at which a load is connected to the shaft in use, the torque point and the load point being longitudinally spaced, the shaft, in use, being stressed and undergoing twist between the torque point and the load point, one of the or each measure point and the or each datum point being positioned along said stressed portion of the shaft, the other of the or each measure point and the or each datum point being positioned in a relaxed portion of the shaft beyond one of the torque point and the load point.

12. A measuring apparatus as claimed in claim 11 in which the shaft is a main shaft of a gas turbine engine the measuring apparatus including a plurality of datum points and a plurality of measure points, the datum points and the measure points being respectively on vanes of the compressor and the turbine, the respective vanes being masses of magnetic material, said datum sensor and said measure sensor being correspondingly a plurality of datum sensors and a plurality of measure sensors provided externally, in non-invasive manner, of casings of respectively said compressor and said turbine, the sensors being responsive to proximity of the respective masses of magnetic material to generate signals for recording respectively the datum time moments and the measure time moments.

13. A measuring apparatus as claimed in claim 10 in which the shaft is a crankshaft of a reciprocating internal combustion engine which includes a plurality of cylinders, a ring gear having gear teeth at an end of the crankshaft and a disc at an opposed end of the crankshaft, said measure point being provided respectively by a plurality of measure points respectively on a corresponding plurality of gear teeth of the ring gear, said datum point being provided respectively by a plurality of datum points circumferentially spaced on said disc.

14. An engine including a measuring apparatus as claimed in claim 10;

an engine management apparatus including a comparator arranged to receive a signal indicative of a measured value of a quantity related to torque in a drive shaft of the engine from the measuring apparatus, the comparator being preprogrammed to compare said measured value with a standard value of said quantity related to torque to generate a control signal, the engine management apparatus being responsive to said control signal to control an operating function of the engine.

15. An engine as claimed in claim 14 in which said operating function of the engine is at least one of ignition timing when the engine is a spark ignition engine, injector pump timing when said engine is a diesel engine, boost pressure when said engine is turbocharged or supercharged.

16. An engine as claimed in claim 15 in which the said engine management apparatus is preprogrammed to calibrate the measuring apparatus in respect of datum time periods when the engine is operated under a no load condition.

17. A measuring apparatus as claimed in claim 10 in which preprogramming said processor includes preprogramming it to employ appropriate Fast Fourier Transforms for said ameliorating the effects of vibrations and resonances.

* * * * *

UNITED STATES PATENT AND TRADEMARK OFFICE
CERTIFICATE OF CORRECTION

PATENT NO. : 6,745,621 B1
DATED : June 8, 2004
INVENTOR(S) : Bartolomomeus Johannes Le Roux Cilliers et al.

It is certified that error appears in the above-identified patent and that said Letters Patent is hereby corrected as shown below:

Title page,
Item [54], Title, change "RATATING" to-- ROTATING --.

Column 9,
Line 28, change "resect" to -- respect --;
Line 60, after "ameliorating" insert -- the --;

Column 10,
Line 28, change "on" to -- one --.

Signed and Sealed this

Twenty-third Day of November, 2004

JON W. DUDAS
*Director of the United States Patent and Trademark Office*